United States Patent [19]

Miyake et al.

[11] 4,219,439
[45] Aug. 26, 1980

[54] METHOD OF MAKING OIL-CONTAINING MICROCAPSULES

[75] Inventors: Makoto Miyake, Nishinomiya; Tomoharu Shiozaki, Amagasaki; Shunsuke Shioi, Daito; Tetsuo Shiraishi, Amagasaki; Takao Matsushita, Kobe, all of Japan

[73] Assignee: Kanzaki Paper Mfg. Co. Ltd., Tokyo, Japan

[21] Appl. No.: 892,317

[22] Filed: Mar. 31, 1978

Related U.S. Application Data

[63] Continuation-in-part of Ser. No. 873,429, Jan. 27, 1978, abandoned.

[30] Foreign Application Priority Data

Jan. 28, 1977 [JP] Japan .................. 52-9022

[51] Int. Cl.² ................................... B01J 13/02
[52] U.S. Cl. ............................. 252/316; 282/27.5; 428/307; 428/914
[58] Field of Search ............. 252/316; 428/307, 914

[56] References Cited

U.S. PATENT DOCUMENTS

| | | | |
|---|---|---|---|
| 3,016,308 | 1/1962 | Macaulay | 428/327 X |
| 3,041,289 | 6/1962 | Katchen et al. | 252/316 |
| 3,415,758 | 12/1968 | Powell et al. | 264/4 X |
| 3,687,865 | 8/1972 | Katayama et al. | 252/316 |
| 3,738,857 | 6/1973 | Brockett et al. | 252/316 X |

FOREIGN PATENT DOCUMENTS

51-118509 10/1976 Japan .................. 428/307
1517442 7/1978 United Kingdom .................. 428/307

Primary Examiner—Richard D. Lovering
Attorney, Agent, or Firm—Cushman, Darby & Cushman

[57] ABSTRACT

The method of making oil-containing microcapsules comprises the steps of (1) preparing an aqueous system comprising an aqueous solution of at least two kinds of hydrophilic colloid materials with opposite electric charges and oil droplets dispersed in said solution (2) causing coacervation in said aqueous system at a temperature above the gelation points of said hydrophilic colloid materials to form a coacervate suspension in which each of said oil droplets is surrounded by a coacervate and (3) cooling said coacervate suspension to a temperature below the gelation points of said hydrophilic colloid materials to form multi-nucleus capsules. During the step of cooling the coacervate suspension, aggregation of particles of oil droplets each having a coacervate therearound is controlled by an agitation flow so as to allow formation of multi-nucleus microcapsules having an average diameter within the range of 3 to 20 microns. Aggregation of particles of oil droplets each having a coacervate therearound is controlled by an agitation flow produced by rotating at least one agitator in a vessel containing the coacervate suspension under the special conditions.

7 Claims, 34 Drawing Figures

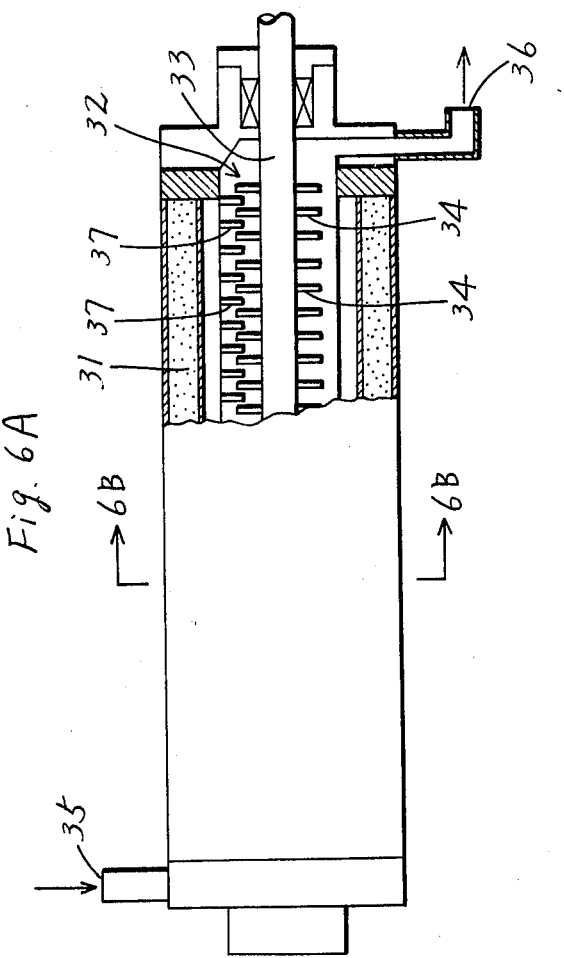

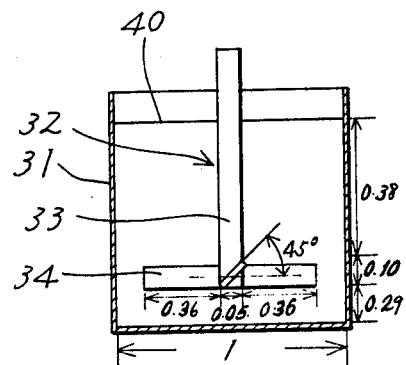
Fig. 14A
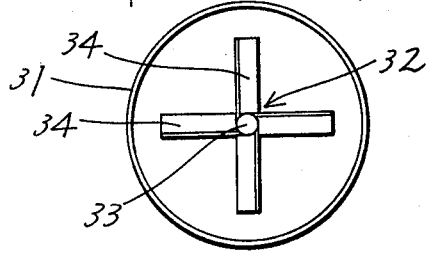
Fig. 14B
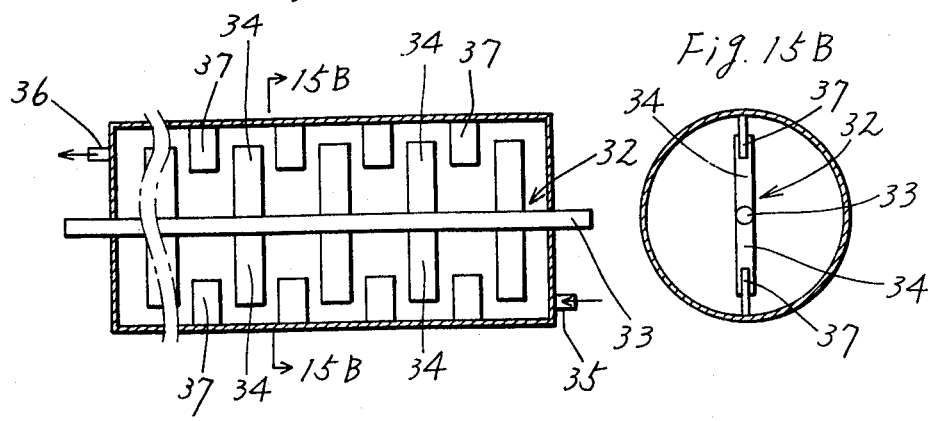
Fig. 15A
Fig. 15B

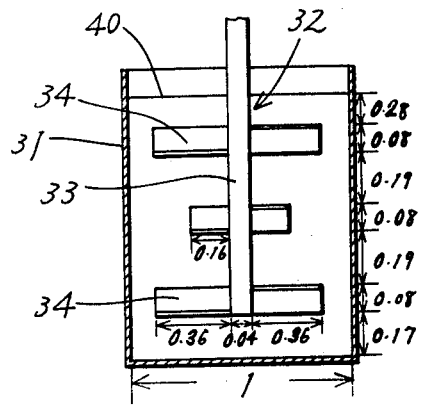
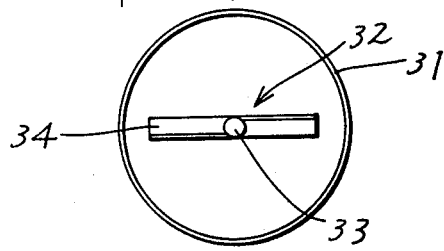
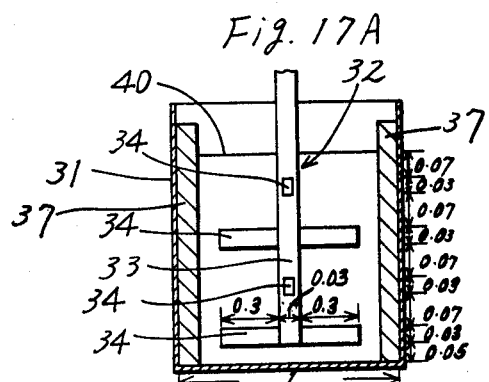
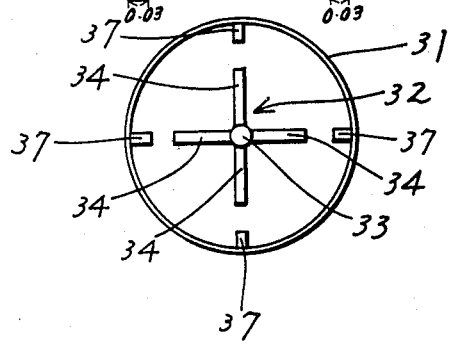

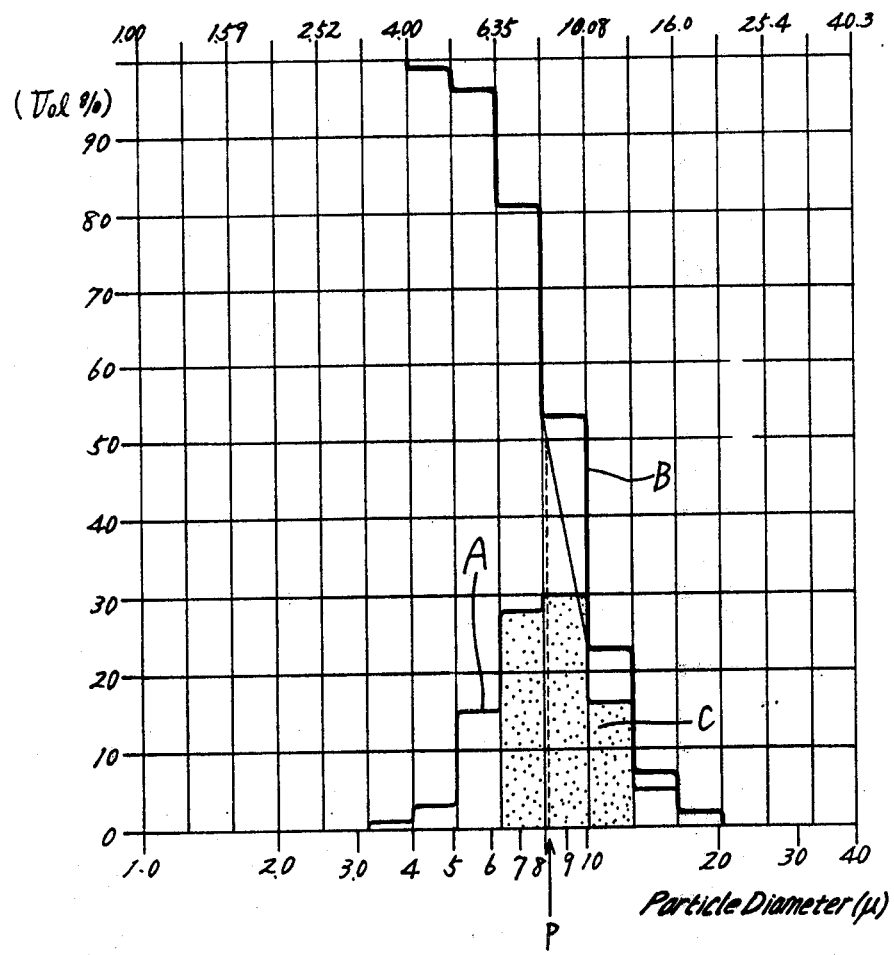

METHOD OF MAKING OIL-CONTAINING MICROCAPSULES

CROSS REFERENCE TO RELATED APPLICATION

This application is a continuation-in-part of our earlier application Ser. No. 873,429 filed Jan. 27, 1978, and now abandoned, for METHOD OF MAKING OIL-CONTAINING MICROCAPSULES.

BACKGROUND OF THE INVENTION

This invention relates to a method of making microcapsules containing after immiscible oil droplets and more particularly to an improved method of making multi-nucleus microcapsules formed by aggregation of such mono-nucleus microcapsules which are useful for the manufacture of pressure-sensitive copying papers.

Pressure-sensitive copying papers and heat-sensitive recording papers which utilize the colour developing reaction between electron donating organic chromogenic material (hereinafter referred to as "colour former") and electron accepting acidic reactant material (hereinafter referred to as "acceptor") are now widespread. In pressure-sensitive copying paper at least one of the colour former and the acceptor is contained in microcapsules so as to be isolated from the other and they become into contact with each other by rupturing such microcapsules to develop a colour. In a most typical type of pressure-sensitive copying paper minute oil droplets in which the colour former is dispersed or dissolved are encapsulated and coated onto papers.

Pressure-sensitive copying papers found their usefulness in a variety of commercial material applications. For example they are very useful as computer output recording papers, business forms and copying slips. In these arts one of the requirements in the quality is that the copying can be done at one time and under usually applied pressure for as many superposed sheets of paper as possible. This requirement, however, involves a disadvantage that paper sheets are easily smudged by inadvertent pressure during storage, handling and shipping. There has been proposed pressure sensitive copying paper having a coating layer of multi-nucleus microcapsules, e.g., as disclosed in U.S. Pat. No. 3,041,289 and Japan Kokai (Laid Open Patent Publication) No. 118,509 of 1976. The conventional technique of making the multi-nucleus microcapsules has never been able to resolve the antinomic problem that the copying capacity of the multilayered copying paper sheets should be increased while preventing the copying paper sheets from being smudged by inadvertent pressure.

The most typical method for making oil-containing microcapsules is to utilize the coacervation technique. For example, according to the disclosure in U.S. Pat. No. 2,800,457 oil-containing microcapsules are made by the following steps:

(1) A mixture of two different hydrophilic colloid sols in which oil droplets are dispersed is prepared. The mixture may be made by forming an aqueous sol of one colloid material, emulsifying the selected oil therein, and mixing the emulsion with an aqueous sol of another colloid material, or the two sols may be made and mixed and the oil emulsified therein. The two colloid materials are gellable and have opposite electric charges.

(2) Coacervation is caused by dilution and/or by adjusting the pH of the mixture to form and adhere a coacervate around each of the oil droplets.

(3) The coacervate around each of the oil droplets is gelled by cooling; and (4) The coacervate is further hardened by addition of a hardening agent or by adjusting the pH to an alkaline zone.

It is considered that in order to resolve the beforementioned antinomic problem it is imperative to obtain oil-containing microcapsules having selected and generally uniform particle sizes within a limited range. The particle size of the microcapsules obtained by the above mentioned coacervation technique depends on various factors such as the temperature and the pH of the system, the colloid concentration in the system, the kinds of colloid materials used and the composition ratio of the oil and the colloid materials. It is our conclusion after substantial investigations and experiments that it would be impossible or extremely difficult to obtain microcapsules having desired and generally uniform particle sizes with chemical adjustment of any of the above mentioned factors alone.

The primary object of the invention is to provide an improved method of making multi-nucleus oil-containing microcapsules having selected and generally uniform particle sizes as desired.

Another object of the invention is to provide an improved method of controlling the particle size and its uniformity of the multi-nucleus oil-containing microcapsules as desired through the utilization of a specified agitation flow during the steps of making oil-containing microcapsules according to the coacervation technique.

A still further object of the invention is to provide an improved method for the production of pressure-sensitive copying paper sheets which have an improved recordability for multi-layered or thick copying paper sheets while preventing those paper sheets to the utmost extent from being soiled or smudged by an inadvertent pressure applied.

Other objects and advantages of the invention will be apparent from the following detailed description.

SUMMARY OF THE INVENTION

According to the invention in the method of making oil-containing microcapsules comprising the steps of (1) preparing an aqueous system comprising an aqueous solution of at least two kinds of hydrophilic colloid materials with opposite electric charges and oil droplets dispersed in said solution, (2) causing coacervation in said aqueous system at a temperature above the gelation points of said hydrophilic colloid materials to form a coacervate suspension in which each of said oil droplets is surrounded by a coacervate and (3) cooling said coacervate suspension to a temperature below the gelation points of said hydrophilic colloid materials to form multi-nucleus capsules, agregation of particles of oil droplets each having a coacervate therearound is controlled, during the step of cooling the coacervate suspension, by an agitation flow so as to allow formation of multi-nucleus microcapsules having an average diameter within the range of 3 to 20 microns.

In a preferred embodiment of the invention, aggregation of particles of oil droplets each having a coacervate therearound is controlled by an agitation flow produced by rotating at least one agitator having at least one vane in a vessel containing the coacervate suspension under the following conditions:

$$0.3 \leq 2a/D < 1$$

$$0.05 \leq Sp/St \leq 1$$

$$5 \leq n \leq 200$$

wherein D is the maximum inner diameter of the vessel, a is the maximum radius of gyration of the agitator, ST is the maximum vertical sectional area of the coacervate suspension in the vessel, Sp is the maximum vertical sectional area of the agitator vane rotating space and n is the number of revolutions per minute of the agitator. If the agitator has two or more radially extending vanes or two or more agitators are used in a single vessel, the value Sp should be the total of the respective maximum vertical sectional areas of the vanes.

BRIEF DESCRIPTION OF THE DRAWINGS

FIG. 6A is a front view, partly in section, of another agitation vessel in which the agitator shaft extends in a horizontal direction and the liquid to be agitated can continuously flow therethrough;

FIG. 6B is a sectional view taken along the lines 6B—6B of FIG. 6A;

FIGS. 11A, 12A, 13A, 14A, 15A, 16A, 17A, 18A and 19A are schematic vertical sectional views of agitation vessels which are used in the examples hereinafter described;

FIGS. 11B, 12B, 13B, 14B, 16B, 17B, 18B and 19B are plan views of the vessels illustrated in FIGS. 11A, 12A, 13A, 14A, 16A, 17A, 18A and 19A, respectively;

FIG. 15B is a sectional view taken along the lines 15B—15B of FIG. 15A; and

FIG. 20 illustrates a part of the chart on which the particle size distribution of the multi-nucleus microcapsules obtained according to the invention is recorded by Coulter Counter.

DETAILED DESCRIPTION OF THE INVENTION

Figure 1:
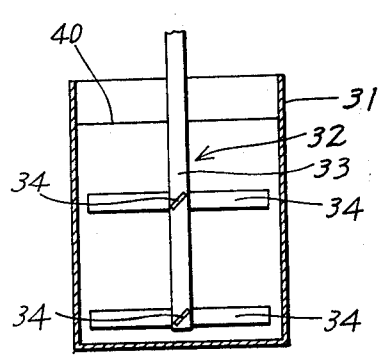
FIGS. 1 to 5 are schematic vertical sectional views of vessels for agitation adapted for use in carrying out the invention, which are provided with vane agitators of different shapes, respectively.
Figure 2:
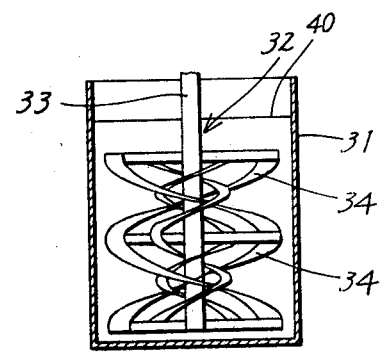
Figure 3:
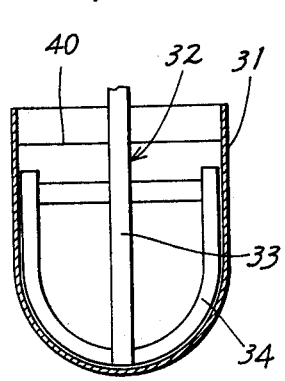

The first step of the method of making oil-containing microcapsules according to the invention is to prepare an aqueous system comprising an aqueous solution of at least two kinds of hydrophilic colloid materials with opposite electric charges. Such the aqueous system like this may be prepared either by forming aqueous sol of one colloid material, emulsifying the selected oil therein, and mixing the emulsion with an aqueous sol of another colloid material, or, by forming a mixed sol of the two colloid materials and emulsifying the oil therein.

In case of the manufacture of microcapsules for use in pressure-sensitive copying paper a colour former and/or an acceptor is dispersed or dissolved in the oil droplets.

The oil may be any of conventional ones. For examples, animal oils such as fish oil and lard oil; vegetable oils such as castor oil, soybean oil, linseed oil, earth-nut oil and corn oil; mineral oils such as kerosene, naphtha and paraffin oil; synthetic oils such as alkylated naphthalene, alkylated biphenyl, hydrogenated terphenyl and alkylated diphenylmethane and the like may be used either solely or in combination.

Among the useful colour former compounds there may be included triarylmethane derivatives such as 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis-(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis-(2-phenylindole-3-yl)-5-dimethylaminophthalide and 3-p-dimethylaminophenyl-3-(1-methylpyrrole-2-yl)-6-dimethylaminophthalide, diphenylmethane derivatives such as 4,4'-bis-dimethylaminobenzhydrinebenzylether, N-halophenyl-leucoauramine and N-2,4,5-trichlorophenyl-leucoauramine, xanthene derivatives such as rhodamine-B-anilinolactam, rhodamine-(p-nitro-anilino)lactam, rhodamine-(p-chloroanilino)lactam, 3-dimethylamino-7-methoxyfluoran, 3-diethylamino-6-methoxyfluoran, 3-diethylamino-7-methoxyfluoran, 3-diethylamino-7-chlorofluoran, 3-diethylamino-7-chloro-6-methylfluoran, 3-diethylamino-6,8-dimethylfluoran, 3-diethylamino-7-(acetylmethylamino)fluoran, 3-diethylamino-(7-methylamino)fluoran, 3,7-diethylaminofluoran, 3-diethylamino-7-(dibenzylamino)fluoran, 3-diethylamino-7-(methylbenzylamino)fluoran, 3-diethylamino-7-(chloroethylmethylamino)fluoran and 3-diethylamino-7-(diethylamino)fluoran, thiazine derivatives such as benzoylleuco-methylene blue and p-nitrobenzyl-leucomethylene blue, and spirocompounds such as 3-methyl-spiro-dinaphtopyrane, 3-ethyl-spiro-dinaphthopyrane, 3,3'-dichlorospiro-dinaphthopyrane, 3-benzylspiro-dinaphthopyrane, 3-methyl-naphtho-(3-methoxy-benzo)-spiropyrane and 3-propyl-spiro-dibenzopyrane. These compounds may be used either solely or in combination.

Among the useful acceptor compounds there may be included inorganic acid materials such as acid clay, activated clay, attapulgite, silica, zeolite, bentonite and aluminum silicate, and organic acceptors such as phenolic compounds and phenol resins, e.g., phenol-aldehyde polymers and phenol-acetylene polymers and polyvalent metal salts of phenol resins as disclosed in U.S. Pat. Nos. 3,516,845 and 3,732,120; aromatic carboxylic acids, e.g., benzoic acid, salicylic acid, 3,5-di-tert-butyl salicylic acid, 3-phenyl-5-($\alpha,\alpha$-dimethylbenzyl)salicylic acid, 3,5-di($\alpha$-methylbenzyl)salicylic acid, and 1-hdyroxy-2-carboxynaphthalene, and polyvalent metal salts of aromatic carboxylic acids as disclosed in U.S. Pat. Nos. 3,864,146, 3,924,027 and 3,983,292; and aromatic carboxylic acid-aldehyde polymers, aromatic carboxylic acid-acetylene polymers, and their polyvalent metal salts as disclosed in U.S. Pat. No. 3,767,449 and No. 3,772,052. These compounds may also be used either solely or in combination.

The colloid materials may also be of any known type. For example, they may be selected from the group consisting of natural and synthetic hydrophilic colloids such as gelatin; albumin; casein; cellulose derivatives for example, carboxymethylcellulose; carboxyethylcellulose; carboxymethylethylcellulose; carboxymethylhydroxyethylcellulose and sulfonated cellulose; gum arabic; carrageenan; sodium alginate; carboxymethylated starch; phosphated starch; styrene-maleic anhydride copolymer and methylvinylether-maleic anhydride copolymer.

The particle size of the emulsified oil droplets as mono-nuclei for microcapsules may be within the range of 1 to 10 microns, preferably, within the range of 1.5 to 5 microns in terms of the diameter measured by Coulter Counter, Model TA manufactured by Coulter Electronics Inc., USA.

The emulsifying step may be effectively carried out by using any of conventional agitators or stirrers such as homogenizer, propeller mixer and Warren blender.

In some cases any of surfactants such as sodium alkylbenzenesulfonate, sodium salt of naphthalenesulfonic acid-formaldehyde condensate, sodium alkylsulfate, potassium ligninsulfonate, sodium oleate and sulfonated oil may be used in the emulsifying step.

The next step to make microcapsules is to cause coacervation in the aqueous system thus prepared to form a coacervate suspension in which a coacervate is deposited on and around each of the oil droplets. The coacervation may be caused by dilution and/or by adjusting the pH of the system.

The amount of water to be added for dilution may be decided as desired according to the coacervation conditions required, but usually water is added in such an amount as to reduce the colloid concentration in the system to 2 to 5% by weight.

The pH value for causing coacervation depends on the isoelectric point of the colloid material to be used. For example, if an acid-treated gelatin having an isoelectric point of about 8.0 is used, the pH of the system may be adjusted within the range of 4.0 to 6.0.

It is not always desirable to cause coacervation at the optimum conditions. According to the invention coacervation may preferably be caused not at the optimum conditions. This can be achieved by any of reducing the amount of water added, adjusting the pH so as not to be an optimum value and changing the composition ratio of the colloid material to form coacervates.

A sufficient agitation during the coacervation step is also preferred for the purpose of preventing formation of coacervate aggregation masses of undesirably great dimensions.

It must be noted that the temperature of the system must be maintained above the gelation points of the colloid materials throughout the emulsifying and coacervation steps. Usually the temperature of the system may preferably be maintained at a constant temperature fairly above the gelation points of the colloid materials.

The coacervate suspension is then cooled with a gentle temperature gradient until a temperature below the gelation points of the colloid materials to gel the coacervate deposited around each of the oil droplets to obtain fixed capsules. In this process individual coacervates tend to adhere to each other. In some cases many individual coacervates are adhered to each other to form multi-nucleus capsules of undesirably great diameters. In another some cases formation of multi-nucleus capsules is prevented by an undesirably strong external force applied.

According to the invention, aggregation of particles of oil droplets with coacervates is precisely controlled by a specified agitation flow applied to the system so that multi-nucleus capsules having desired diameters and desired particle size uniformity may be obtained. This is owing to an appropriate balance between the adhesion force of coacervates and the separation force given by the controlled agitation flow. At least all during the step of cooling the coacervate suspension the agitation flow applied must be so controlled as to only allow formation of microcapsule aggregation masses having an average particle diameter of 3 to 20 microns, preferably, 6 to 15 microns. The average particle diameter mentioned in this specification means the particle size in terms of an average value of the particle diameters calculated from the particle size distribution measured by Coulter Counter, Model TA manufactured by Coulter Electronics Inc., USA.

It has been observed and confirmed that if the average particle diameter of each of the microcapsule aggregation masses is smaller than 3 microns the colour developing ability is insufficient and if the average diameter of each of the microcapsule aggregation masses is greater than 20 microns the copying paper sheets are easily smudged by inadvertent pressure applied.

According to the invention the above mentioned specifically controlled agitation flow may preferably be produced by rotating at least one agitator having at least one vane in a vessel containing the coacervate suspension under the following conditions:

$$0.3 \leq 2a/D < 1$$

$$0.05 \leq Sp/ST \leq 1$$

$$5 \leq n \leq 200$$

In the above formulas D is the maximum inner diameter of the vessel, a is the maximum radius of gyration of the agitator, ST is the maximum vertical sectional area of the coacervate suspension in the vessel, Sp is the maximum vertical sectional area of the agitator vane rotating space and n is the number of the revolutions per minute of the agitator. If the agitator has two or more radially extending vanes or two or more agitators are used in a single vessel, the value Sp should be the total of the respective maximum vertical sectional areas of the vanes. In the calculation of Sp the vertical sectional area of the rotating shaft may be excluded.

Some of actually useful agitator assemblies are illustrated by way of examples in the attached drawings.

Referring now to the drawings, throughout FIGS. 1 to 19 the reference numeral 31 indicates vessels, the reference numeral 32 generally indicates agitators rotatable in the respective vessels 31. Each of the vessels may preferably be provided with suitable cooling means. Each of the agitators 32 comprises a rotating shaft 33 and at least one agitation vane 34 fixed to the shaft 33. The reference numeral 40 indicates the level of the liquid in the vessel.

The vane 34 of the agitator 32 may be shaped in any form as desired. For example, the vane 34 is shaped in any flat plate form (FIGS. 1, 4, 6A and 6B, 7A and 7B, and 8B; 9A and 9B, 10A and 10B, 11A and 11B, 13A and 13B, 14A and 14B, 15A and 15B, and 16A and 16B, in any straight bar form (FIGS. 17A and 17B), in any frame form (FIGS. 2, 3 and 12A and 12B) or in any screw form (FIGS. 5, 18A and 18B, and 19A and 19B).

The agitator 32 may rotate either about a vertical axis or about a horizontal axis. FIGS. 6A and 6B, and 15A and 15B illustrates agitators of the horizontal axis type. The agitators of the horizontal axis type is advantageous for a continuous treatment of the liquid. In FIGS. 6A and 15A, the reference numerals 35 and 36 indicates the inlet and the outlet for the liquid to be treated, respectively. The other Figures illustrate vertical axis type agitators.

The vessel 31 may be provided with at least one projection or stationary vane which cooperate with the vane 34 of the agitator 32 to effectively produce a turbulent flow. In the embodiments illustrated in FIGS. 6A and 6B, 7A and 7B, 8A and 8B, 9A and 9B, 13A and 13B, 15A and 15B, and, 17A and 17B, such projections or stationary vanes fixed to the inner wall of the vessel are indicated with the reference numeral 37.

Figure 4:
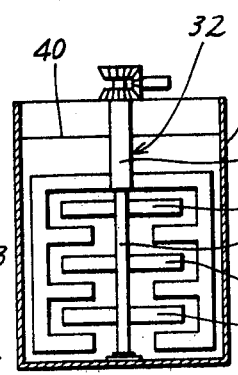
Figure 5:
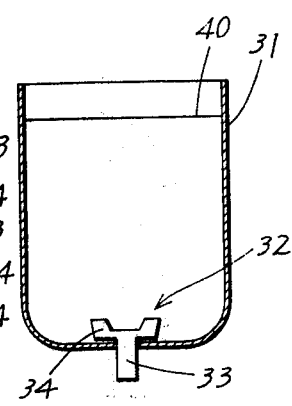
Figure 7A:
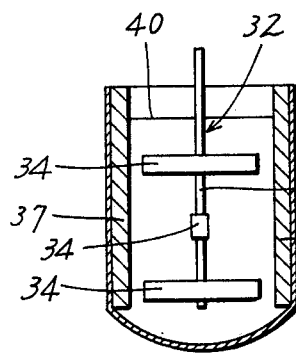
FIGS. 7A, 8A and 9A are schematic vertical sectional views of agitation vessels illustrating further embodiments, respectively.
Figure 8A:
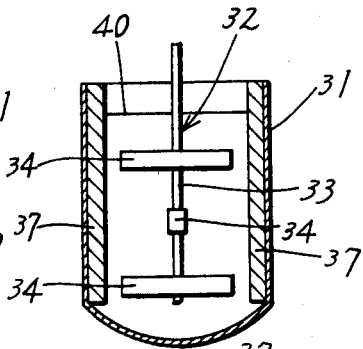
Figure 7B:
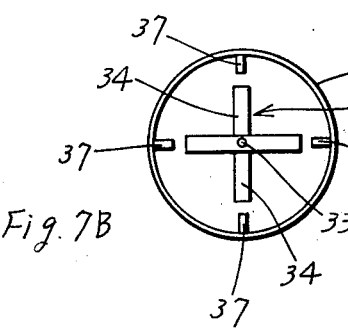
FIGS. 7B, 8B and 9B are plan views of FIGS. 7A, 8A and 9A, respectively.
Figure 8B:
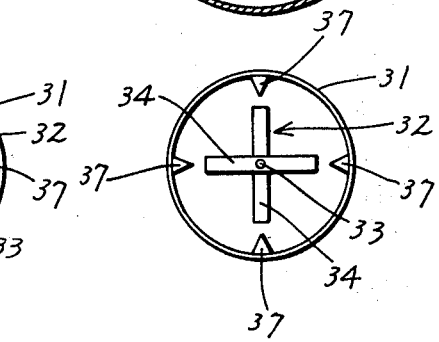
Figure 9A:
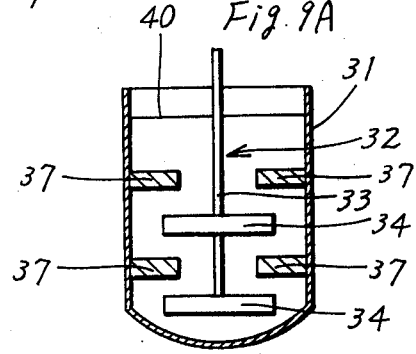
Figure 9B:
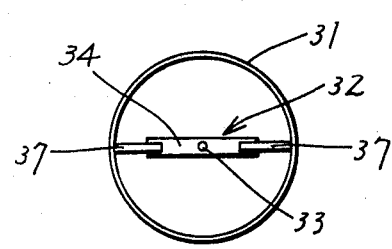
Figure 10A:
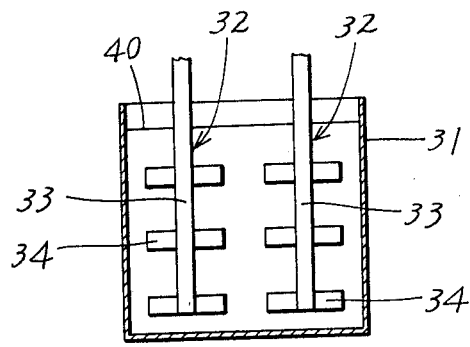
FIG. 10A is a schematic vertical sectional view of an agitation vessel having two rotatable vane agitators.
Figure 10B:
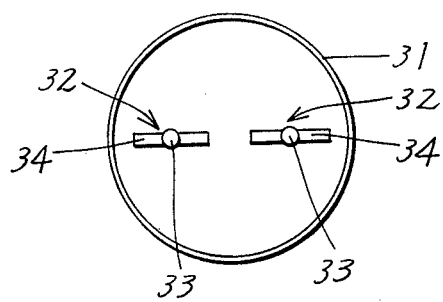
FIG. 10B is a plan view of the vessel illustrated in FIG. 10A.

The plurality of agitators may also be assembled in a single vessel. FIGS. 10A and 10B illustrate the provision of two agitators 32 in a single vessel 31. The shape, size, number and speed of vanes of the two or more agitators may be either the same or different to each other. FIG. 4 illustrates another embodiment of the provision of two agitators 32 coaxially arranged in the vessel 31. The two agitators 32 have the respective vanes 34 of different shapes, arranged in staggered positions and can rotate in the opposite directions so that an effective agitation can be produced.

In FIGS. 11A, 11B, 12A, 12B, 13A, 13B, 14A, 14B, 16A, 16B, 17A, 17B, 18A, 18B, 19A and 19B dimensional ratios of various parts are indicated.

According to the invention multi-nucleus oil-containing capsules can have desired and generally uniform particle sizes owing to the fact that coacervates deposited on the oil droplets are prevented from being adhered to each other to an appropriate extent by the force of the agitation flow under control. It has been observed that the uniformity of the particle size of the multi-nucleus capsules obtained according to the invention is so good that more than 50% of the particles belong to the channel of the peak and its adjoining channels in the volume integration of particles having different particle diameters measured by Coulter Counter.

FIG. 20 illustrates a part of chart on which a particle size distribution measured by Coulter Counter is recorded. In the chart illustrated in FIG. 20 the lateral axis indicates the particle size in a logarithmic scale in microns and the vertical axis indicates the weight or volume percentage. The chart has vertically extending scale lines with regular intervals to divide the range of measurement into a plurality of channels for each of which the total volume or weight of the particles is measured and recorded. The reference character A indicates the particle size distribution by weight or volume measured and recorded and reference character B indicates the integration of the particle size distribution indicated by A. The point P in the lateral axis indicates the average particle diameter which should correspond to the integrated weight or volume at 50% of the vertical axis scale. The reference character C indicates the area including the peak channel and its adjoining channels. As is apparent from FIG. 20 the total area indicated by C is larger than 50% of the total volume or weight of the particles.

DETAILED DESCRIPTION OF THE PREFERRED EMBODIMENTS

The following examples serve to illustrate the invention in more detail although the invention is not limited to the examples. Unless otherwise indicated, parts and % signify parts by weight and % by weight, respectively.

EXAMPLE 1

Figure 11A:
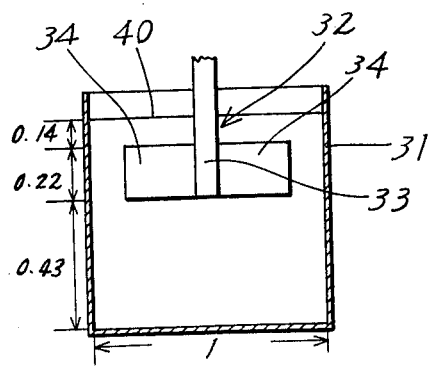
Figure 11B:
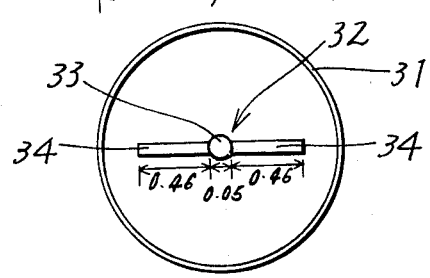

50 Parts of an acid-treated gelatin having an isoelectric point of 8.0 was added to 450 parts of water. After standing for one hour at 10° C., the mixture was heated at 60° C. to prepare a gelatin solution. 4 Parts of crystal violet lactone and 2 parts of benzoyl leucomethylene blue were dissolved in a mixed oil consisting of 60 parts of kerosene and 140 parts of isopropylnaphthalene to prepare a color former solution. The color former solution was, after being heated at 60° C., added to the gelatin solution and the mixture was emulsified by a homomixer so as to obtain oil droplets having an average particle diameter of 3.5 microns. To the emulsion under continued agitation 1000 parts of warm water of 55° C. and 100 parts of 5% aqueous solution of CMC having an average polymerization degree of 160 and a substitution degree of 0.6 were added. Maintaining the temperature of the aqueous system at 50° C., 10% aqueous solution of caustic soda was added to the system to adjust the pH of the system to 5.4. The aqueous system was poured into an agitator vessel as shown in FIGS. 11A and 11B. While agitation was being carried out under the following conditions, the system in the vessel was gradually cooled from the initial temperature of 50° C. with a temperature drop gradient of 1° C. per 6 minutes:

$2a/D = 0.97$ $Sp/ST = 0.25$ $n = 100$

It was confirmed by microscopic observation that adhesion of microcapsules to each other was initiated at about 35° C. and substantially completed at about 20° C. The system was finally cooled until 10° C. to completely gel the coacervates. The particle size distribution of the capsules obtained was measured by Coulter Counter. The average particle diameter of the capsules was 8.6 microns and the volume percentage of the particles contained in the unit channel including the peak and its adjoining unit channels in the chart of Coulter Counter was 83%. To the system thus obtained 10 parts of 50% aqueous solution of glutaric aldehyde was added at 10° C. and then the pH of the system was adjusted to 6.0 with an aqueous solution of caustic soda to complete the hardening of capsules. To the hardened capsules-containing liquid thus obtained were added 40 parts of pulp powder and 400 parts of 10% aqueous solution of starch to prepare a coating composition for pressure-sensitive copying paper. The coating composition was coated in one surface of paper sheet of 40 g/m$^2$ in an amount of 5 g/m$^2$ on dry basis to obtain a capsule coated sheet.

EXAMPLE 2

50 Parts of an acid-treated gelatin having an isoelectric point of 8.0 was added to 450 parts of water. After standing for one hour at 10° C., the mixture was heated at 60° C. to prepare a gelatin solution. 4 Parts of crystal violet lactone and 2 parts of benzoyl leucomethylene blue were dissolved in a mixed oil consisting of 60 parts of kerosene and 140 parts of isopropylnaphthalene to prepare a color former solution. The color former solution was, after being heated at 60° C., added to the gelatin solution and the mixture was emulsified by a homomixer so as to obtain oil droplets having an average particle diameter of 3.1 microns. The pH of the emulsion was adjusted to 7.0 with 10% aqueous solution of caustic soda. Then to the emulsion 1000 parts of warm water of 55° C. was added and further 35 parts of 5% aqueous solution of polyvinylmethylethermaleic anhydride copolymer was added with stirring. The pH of the aqueous system was adjusted to 5.2 with an aqueous solution of acetic acid. The aqueous system was poured into the same vessel as in Example 1. While agitation was being carried out under the following conditions, the system in the vessel was gradually cooled from the initial temperature of 50° C. with a temperature drop gradient of 1° C. per 6 minutes:

$2a/D = 0.97$ $Sp/ST = 0.25$ $n = 100$

The system was cooled until 10° C. The particle size distribution of the capsules obtained was measured by Coulter Counter. The average particle diameter of the capsules was 10.9 microns and the volume percentage of the particles contained in the unit channel including the peak and its adjoining unit channels in the chart of Coulter Counter was 70%. A capsule coated sheet was obtained in the same manner as in Example 1.

EXAMPLE 3

Figure 12A:
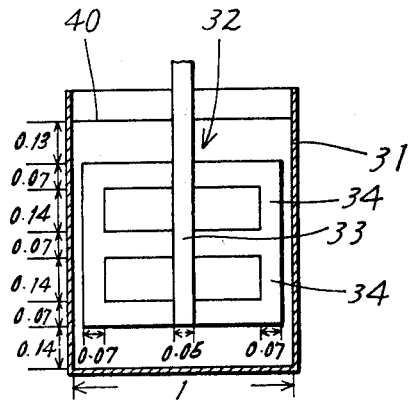
Figure 12B:
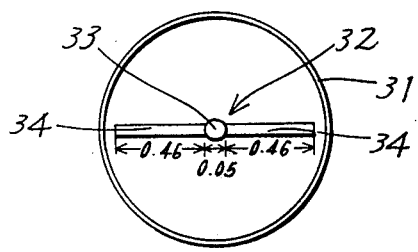

Example 1 was repeated to obtain a capsule coated sheet except that a vessel as shown in FIGS. 12A and 12B was used as an agitator vessel and the agitation in the vessel was carried out under the following conditions:

$2a/D = 0.97$ $Sp/ST = 0.32$ $n = 100$

The average particle diameter of the capsules obtained was 9.3 microns and the volume percentage of the particles contained in the unit channel including the peak and its adjoining unit channels in the chart of Coulter Counter was 70%.

EXAMPLE 4

Figure 13A:
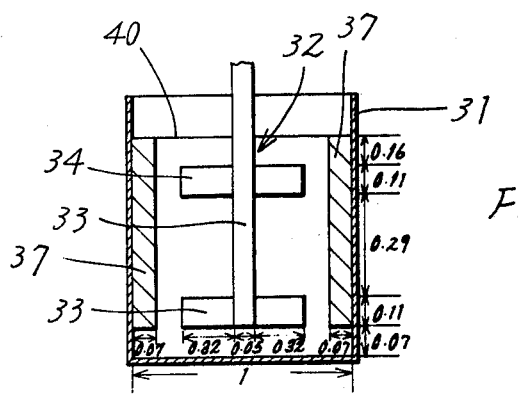
Figure 13B:
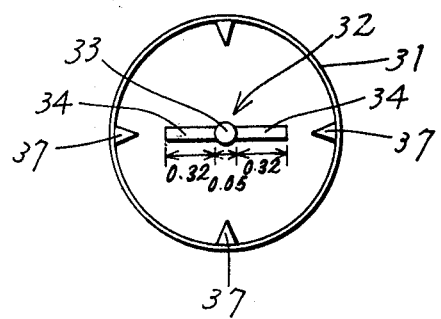

Example 1 was repeated to obtain a capsule coated sheet except that a vessel as shown in FIGS. 13A and 13B was used as an agitator vessel and the agitation in the vessel was carried out under the following conditions:

$2a/D = 0.67$ $Sp/ST = 0.25$ $n = 80$

The average particle diameter of the capsules obtained was 9.4 microns and the volume percentage of the particles contained in the unit channel including the peak and its adjoining unit channels in the chart of Coulter Counter was 81%.

EXAMPLE 5

Example 2 was repeated to obtain a capsule coated sheet except that a vessel as shown in FIGS. 14A and 14B was used as an agitator vessel and the agitation in the vessel was carried out under the following conditions:

$2a/D = 0.76$ $Sp/ST = 0.18$ $n = 190$

The average particle diameter of the capsules obtained was 8.2 microns and the volume percentage of the particles contained in the unit channel including the peak and its adjoining unit channels in the chart of Coulter Counter was 78%.

EXAMPLE 6

55.5 Parts of an acid-treated gelatin having an isoelectric point of 8.0 was added to 500 parts of water. After standing for one hour at 10° C., the mixture was heated at 60° C. to prepare a gelatin solution. 1.0 Part of crystal violet lactone and 0.5 parts of benzoyl leucomethylene blue were dissolved in a mixed oil consisting of 15 parts of kerosene and 35 parts of isopropylnaphthalene to prepare a color former solution. The color former solution was, after being heated at 60° C., added to the gelatin solution and the mixture was emulsified by a homomixer so as to obtain oil droplets having an average particle diameter of 3.1 microns. The pH of the emulsion was adjusted to 8.0 with 10% aqueous solution of caustic soda. Then to the emulsion a gum arabic solution which was made by dissolving 55 parts of gum arabic in 500 parts of warm water of 60° C. was added and 4000 parts of warm water of 55° C. was added with stirring. Further, 32 parts of 5% aqueous solution of polyvinylmethlethermaleic anhydride copolymer was added in the aqueous system and then the system was adjusted to pH 5.0 with 10% aqueous solution of acetic acid. The aqueous system was poured into an agitator vessel as shown in FIGS. 16A and 16B. While agitation was being carried out under the following conditions, the system in the vessel was gradually cooled from the initial temperature of 50° C. with a temperature drop gradient of 1° C. per 7 minutes:

$2a/D = 0.76$ $Sp/ST = 0.13$ $n = 145$

The system was cooled until 10° C. The particle size distribution of the capsules obtained was measured by Coulter Counter. The average particle diameter of the capsules was 9.8 microns and the volume percentage of the particles of the capsules contained in the unit channel including the peak and its adjoining unit channels in the chart of Coulter Counter was 84%. A capsule coated sheet was obtained with the use of the aqueous system thus obtained in the same manner as in Example 1.

EXAMPLE 7

65 Parts of an acid-treated gelatin having an isoelectric point of 8.0 was added to 585 parts of water. After standing for one hour at 10° C., the mixture was heated at 60° C. to prepare a gelatin solution. 5.2 Parts of crystal violet lactone and 2.6 parts of benzoyl leucomethylene blue were dissolved in a mixed oil consisting of 78 parts of kerosene and 182 parts of isopropylnaphthalene to prepare a color former solution. The color former solution was, after heated at 60° C., added to the gelatin solution and the mixture was emulsified by a homomixer so as to obtain oil droplets having an average particle diameter of 3.0 microns. 1300 Parts of warm water of 55° C. was added to the emulsion and then 130 parts of 5% aqueous solution of CMC having an average polymerization degree of 160 and a substitution degree of 0.6, the amount of which corresponded to 10% by weight on dry basis of gelatin, was added to it. The pH of the aqueous system was adjusted to 5.4 with 10% aqueous solution of caustic soda. The aqueous system was poured into a vessel as shown in FIGS. 17A and 17B. While agitation was carried out under the following conditions, the system in the vessel was gradually cooled from the initial temperature of 48° C. with a temperature drop gradient of 1° C. per 3 minutes:

2a/D=0.63

Sp/ST=0.16 n=40

The system was cooled until 10° C. The particle size distribution of the capsules obtained was measured by Coulter Counter. The average particle diameter of the capsules was 8.2 microns and the volume percentage of the particles contained in the unit channel including the peak and its adjoining unit channels in the chart of Coulter Counter was 74% as shown in FIG. 20. To the system thus obtained 13 parts of 50% aqueous solution of glutaric aldehyde was added at 10° C. and then the pH of the system was adjusted to 6.0 with 10% aqueous solution of caustic soda. Further, to the system 52 parts of pulp powder and 520 parts of 10% aqueous solution of starch were added to prepare a coating composition for pressure sensitive copying paper. A capsule coated sheet was obtained with the use of the coating composition in the same manner as in Example 1.

EXAMPLE 8

Example 7 was repeated to obtain a capsule coated sheet except that the agitator vanes were fixed at an angle 45° C. to the axis of rotation (Sp/ST=0.11) and the revolution number of it was 35 rpm. After cooling the particle size distribution of the capsules obtained was measured by Coulter Counter. The average particle diameter of the capsules was 8.3 microns and the volume percentage of the particles contained in the unit channel including the peak and its adjoining unit channels in the chart of Coulter Counter was 85%.

EXAMPLES 9 to 13

Five different capsule coated paper sheets were prepared in a manner similar to that described in Example 8 except that the average particle diameters of the emulsified droplets at the emulsifying step, the pH values at the coacervation step and the numbers of revolution of agitator were different from those in Example 8 as indicated in Table 1, respectively. The average particle diameters of the multi-nucleus capsules and the volume percentages of the particles included in the channel of the peak and its adjoining channels which were determined as the results of the measurement of the particle size distribution by Coulter Counter.

TABLE 1

|  | average particle diameter of the emulsified droplets (microns) | pH value at the coacervation step | n (rpm) | average particle diameter of the capsules (microns) | the volume percentage of the particles included in the three channels |
|---|---|---|---|---|---|
| Example 9 | 1.6 | 5.1 | 15 | 10.7 | 93 |
| Example 10 | 2.0 | 5.3 | 25 | 6.9 | 89 |
| Example 11 | 2.7 | 5.1 | 20 | 14.3 | 90 |
| Example 12 | 4.0 | 5.3 | 35 | 12.5 | 80 |
| Example 13 | 4.6 | 5.2 | 30 | 11.2 | 70 |

EXAMPLE 14

An aqueous system comprising the emulsion and CMC was prepared in the same manner as in Example 7. The aqueous system was poured into a closed apparatus consisting of two vessels (as shown in FIGS. 15A and 15B) arranged in a series. While agitation was being carried out under the following conditions, the system in the vessel was gradually cooled from the initial temperature of 50° C. with a temperature drop gradient of 1° C. per 2 minutes:

2a/D=0.57

Sp/ST=0.22 n=50

The aqueous system stayed in the apparatus for 80 minutes. The particle size distribution of the capsules obtained at the outlet of the apparatus was measured by Coulter Counter. The average particle diameter of the capsules was 8.0 microns and the volume percentage of the particles contained in the unit channel including the peak and its adjoining unit channels in the chart of Coulter Counter was 79%. To 100 parts of the system thus obtained 0.5 parts of 50% aqueous solution of glutaric aldehyde was added at 10° C. and then the pH of the system was adjusted to 6.0 with 10% aqueous solution of caustic soda to complete the hardening of capsules. To the hardening capsule containing liquid 2.2 parts of pulp powder and 22 parts of 10% aqueous solution of starch were added to prepare a coating composition for pressure-sensitive copying paper. A capsule coated sheet was obtained with the use of the coating composition in the same manner as in Example 1.

CONTROL 1

Figure 18A:
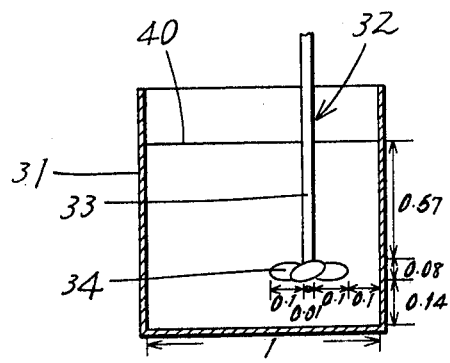
Figure 18B:
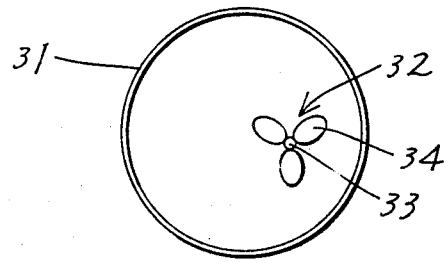

Example 1 was repeated to obtain a capsule coated sheet except that a vessel as shown in FIGS. 18A and 18B was used as an agitator vessel and the agitation in the vessel was carried out under the following condition:

2a/D=0.21

Sp/ST=0.03 n=4,000

The particle size distribution of the capsules obtained at 10° C. was measured by Coulter Counter. The average particle diameter of the capsules was 3.7 microns. It was confirmed by microscopic observation that the each capsule was not almost aggregated and was present in state of mono-nucleus capsule.

CONTROL 2

Control 1 was repeated except that the revolution number of the agitator was 50 rpm. When the aqueous system was cooled until 20° C., coagulation of the system was initiated. The system was completely gelled at 15° C. and any capsule could not be obtained.

CONTROL 3

Figure 19A:
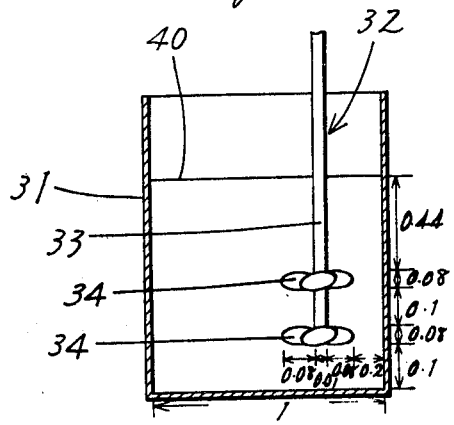
Figure 19B:
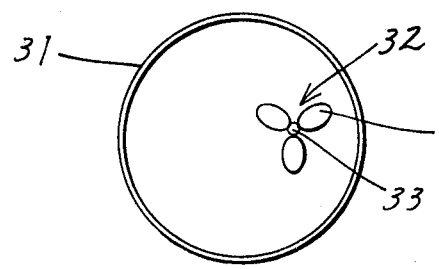

Example 1 was repeated to obtain a capsule coated sheet except that the pH of the aqueous system was adjusted to 4.8 in coacervation step and the system was cooled in an agitator vessel as shown in FIGS. 19A and 19B with the following condition of agitation:

$2a/D = 0.17$ $Sp/ST = 0.04$ $n = 1,800$

The particle size distribution of the capsules obtained at 10° C. was measured by Coulter Counter. The average particle diameter of the capsules was 7.5 microns. The volume percentage of the particles contained in the unit channel including the peak and its adjoining unit channels in the chart of Coulter Counter was 40%.

PREPARATION OF AN ACCEPTOR SHEET

8 Parts of zinc 3,5-di-(α-methylbenzyl)salicylate and 2 Parts of styrene-α-methylstyrene copolymer were melted to obtain a homogeneous mixture. The obtained mixture was then finely divided. 12 Parts of the finely divided mixture, 53 parts of aluminium hydroxide, 20 parts of activated clay, 15 parts of zinc oxide, 30 parts of styrene-butadiene copolymer latex (solid amount of 50%), 6 parts of 10% aqueous solution of modified polyvinyl alcohol and 300 parts of water were mixed to make a coating composition. The coating composition was applied on one surface of a base sheet of 40 g/m² in an amount of 6 g/m² on dry basis and dried to obtain an acceptor sheet.

TEST FOR THE PROPERTIES OF THE CAPSULE COATED SHEETS (a) Each capsule coated sheet obtained in Examples and Controls was put on an acceptor sheet so that the coated layers were close to each other, and stayed for 30 seconds under pressure of 15 Kg/m². The smudge of the acceptor sheet was checked.

(b) Each capsule coated sheet was put on the acceptor sheet so that the coated layers were close to each other and further 10 sheets of white paper of 40 g/m² were put on them. The sheets were printed typewrited from the top of the white paper. The color density of printed images on the acceptor sheet was examined with the use of reflection type double beam spectrophotometer 124 (manufactured by Hitachi, Ltd. Japan). The color density was represented with the reflection ratio at 610 mμ. The larger the reflection ratio, the lower the color density.

The examined properties were shown in Table 2. Every capsule coated sheets obtained in Examples were superior in both of Tests (a) and (b).

TABLE 2

| | a) Smudge* | b) Color Density (%) |
|---|---|---|
| Example 1 | ⊙ | 85 |
| Example 2 | ⊙ | 83 |
| Example 3 | ⊙ | 85 |
| Example 4 | ⊙ | 78 |
| Example 5 | ⊙ | 85 |
| Example 6 | ○ | 80 |
| Example 7 | ○ | 84 |
| Example 8 | ○ | 79 |
| Example 9 | ⊙ | 86 |
| Example 10 | ⊙ | 86 |
| Example 11 | ○ | 75 |
| Example 12 | ○ | 73 |
| Example 13 | ○ | 75 |
| Example 14 | ⊙ | 86 |
| Control 1 | ⊙ | 94 |
| Control 2 | — | —** |
| Control 3 | ○ | 89 |

(Note)
*⊙: Any smudge was not found.
○ : Smudge was little.
△ : Some smudge was found.
X : Smudge was heavy.
**A coated sheet was not made.

What we claim is:

1. In a method of making oil-containing microcapsules for pressure-sensitive copying papers comprising the steps of:
   (1) preparing an aqueous system comprising an aqueous solution of at least two kinds of hydrophilic colloid materials with opposite electric charges and oil droplets dispersed in said solution,
   (2) causing coacervation in said aqueous system at a temperature above the gelation point of said hydrophilic colloid materials to form a coacervate suspension in which each of said oil droplets is surrounded by a coacervate; and
   (3) cooling said coacervate suspension to a temperature below the gelation point of said hydrophilic colloid materials to form multi-nucleus capsules while subjecting said oil droplets each having a coacervate therearound to an agitation flow, the improvement whereby multi-nucleus microcapsules having an average diameter within the range of 3 to 20 microns are formed and more than 50% of the capsule particles belong to the channel of the peak and its adjoining channels in the volume integration of particles having different particle diameters measured by Coulter Counter, said improvement consisting essentially of controlling the aggregation of particles of oil droplets each having a coacervate therearound during said cooling step by an agitation flow produced by rotating at least one agitator having at least one vane in a vessel containing said coacervate suspension under the following conditions:

$0.3 \leq 2a/D \leq 1$ $0.05 \leq Sp/ST \leq 1$ $5 \leq n \leq 200$ wherein D is the maximum inner diameter of the vessel, a is the maximum radius of gyration of the agitator, ST is the maximum vertical sectional area of the coacervate suspension in the vessel, Sp is the total of the maximum vertical sectional area of the agitator vane rotating spaces and n is the number of revolutions per minute of the agitator.

2. A method of making oil-containing microcapsules according to claim 1, in which the average diameter of said oil droplets is within the range of 1 to 10 microns.

3. A method of making oil-containing microcapsules according to claim 1 in which said coacervation is caused by dilution.

4. A method of making oil-containing microcapsules according to claim 3, in which water is added so as to reduce the colloid concentration in said system to 2 to 5% by weight to cause coacervation.

5. A method of making oil-containing microcapsules according to claim 1, in which said coacervation is caused by adjustment of the pH of said system.

6. A method of making oil-containing microcapsules according to claim 5, in which said system utilizes an acid-treated gelatin having an isoelectric point of about 8.0 and the pH of said system is adjusted so as to be within the range of 4.0 to 6.0 enough to cause said coacervation.

7. A method of making oil-containing microcapsules according to claim 1, in which said coacervation step and said cooling step take place in separate vessels, and wherein said droplets in step (1) contain an electron donating chromogenic material.

* * * * *